United States Patent [19]

Okada

[11] Patent Number: 4,865,624
[45] Date of Patent: Sep. 12, 1989

[54] METHOD FOR STEAM REFORMING METHANOL AND A SYSTEM THEREFOR

[75] Inventor: Hidetake Okada, Kawasaki, Japan

[73] Assignee: Nippon Sanso Kabushiki Kaisha, Tokyo, Japan

[21] Appl. No.: 212,671

[22] Filed: Jun. 28, 1988

[30] Foreign Application Priority Data

Jun. 29, 1987 [JP] Japan .................................. 62-161983

[51] Int. Cl.[4] .............................................. C01B 3/02
[52] U.S. Cl. ........................................... 48/61; 48/89; 48/197 R; 252/373; 423/648.1
[58] Field of Search ................. 48/197 R, 89, 61, 119; 423/648.1, 415 A; 252/373; 518/704; 422/190, 191, 193, 197, 202

[56] References Cited

U.S. PATENT DOCUMENTS

| | | | |
|---|---|---|---|
| 3,469,944 | 9/1969 | Bocard et al. | 252/373 |
| 4,256,783 | 3/1981 | Takada et al. | 422/197 |
| 4,316,880 | 2/1982 | Jockel et al. | 423/648.1 |
| 4,331,449 | 5/1982 | Jockel et al. | 48/197 R |

FOREIGN PATENT DOCUMENTS

| | | |
|---|---|---|
| 49-47281 | 5/1974 | Japan . |
| 54-11274 | 5/1979 | Japan . |
| 59-131501 | 7/1984 | Japan . |
| 61-234939 | 10/1986 | Japan . |
| 61-234940 | 10/1986 | Japan . |
| 61-234941 | 10/1986 | Japan . |

*Primary Examiner*—Joye Woodard
*Attorney, Agent, or Firm*—Cushman, Darby & Cushman

[57] ABSTRACT

The present invention relates to a steam reforming method of methanol for obtaining hydrogen gas and a system therefor. The present method and present system utilizes a heat transfer medium for regulating the temperature at each step of the process. By optimizing the flow so that the heat transfer medium circulate through the system as heat-exchanging with reactant at each step, temperature of the reactant is regulated at a desirable temperature for proceeding the reaction. Temperature of the decomposition process and the conversion process of methanol is independently regulated.

8 Claims, 3 Drawing Sheets

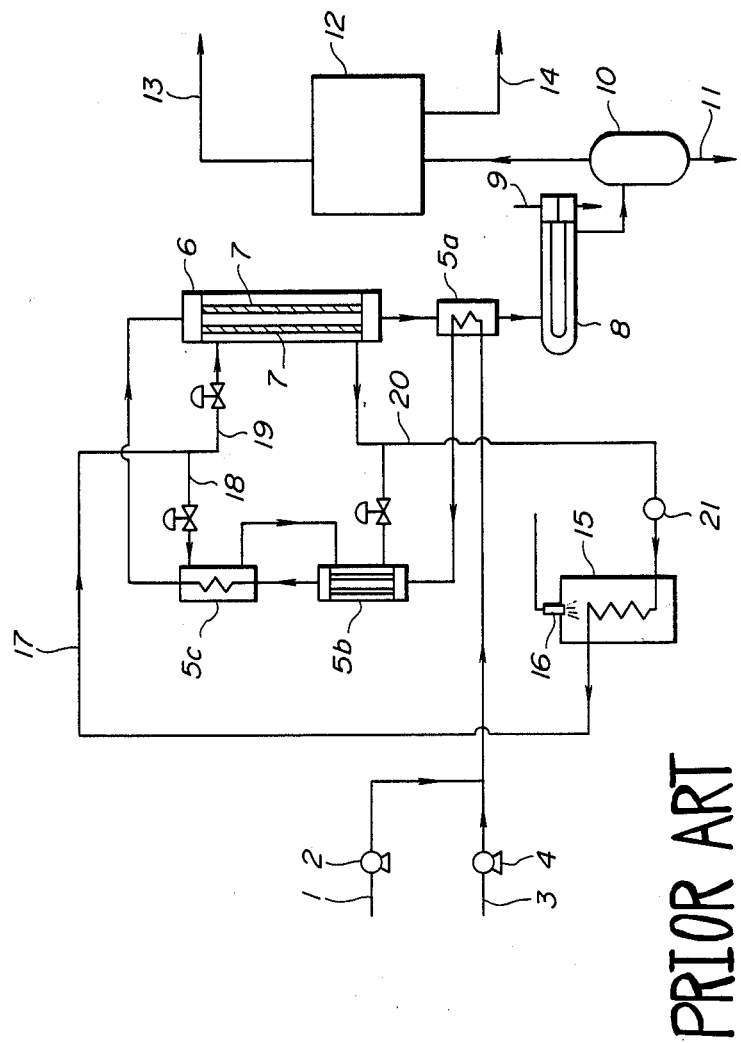

METHOD FOR STEAM REFORMING METHANOL AND A SYSTEM THEREFOR

BACKGROUND OF THE INVENTION

The present invention is related to a steam reforming method for methanol for obtaining hydrogen gas and a system therefor. More specifically, a method of the present invention and system therefore utilizes steam and methanol as raw materials for producing hydrogen gas.

Hydrogen gas has been used in such various processes as reforming process and desulfurizing process in petroleum refinery, and synthetic process and hydrogen annexing process in chemical industries. Recently, hydrogen is becoming to be used in more various industrial areas, for example, as a cover gas of epitaxial furnace or apparatus for fabrication of silicon monocrystal, in fabrication of magnetic iron fillings for audio or video tapes in the field of microelectronics, in fabrication of margarine, shortening and synthetic sweetening in the field of food industry, etc. Thus, hydrogen gas is becoming to be demanded in more and more wide varied industrial and technical fields. Consequently, the area at which hydrogen gas is demanded is becoming more wide spread geographically also than before. This tendency would be more increased by spreading fuel cell as a method for power generation which is expected in the future.

One conventional method for obtaining hydrogen gas is to gather hydrogen gas produced as a by-product in chemical plant or to use COG produced at an iron mill as a source of hydrogen. Then hydrogen gas is recovered and pressurized to filling in vessels to be transported. In such cases, cost is not enough low and the amount of hydrogen gas to be supplied does not satisfy the increasing demand. Further, because the chemical plants and iron mills are located near the market place of their main product, the location is generally far from the area where hydrogen gas is demanded and need of transportation pushes up the cost of hydrogen gas.

On the other hand, chemical plants for producing methanol are being constructed in oil-producing or natural gas-producing countries, and supply of methanol is expected to increase in the future. Therefore, a method for producing hydrogen gas using methanol as a raw material is becoming important. Methanol is convenient for using it as a raw material compared to other materials such as naphtha and butane because the reaction temperature of methanol is lower than that of the others. The reaction temperature of methanol is approximately between 250° C. and 300° C. while that of naphtha and butane is higher than 600° C. One of the strong points of this method is that the hydrogen gas is obtained where the gas is demanded by constructing a plant in that location so as to minimize the transportation cost. The amount of hydrogen gas to be obtained may be far larger than the above method in the light of the large amount of menthol to be produced.

A conventional steam reforming method of methanol for obtaining hydrogen is described with reference to FIG. 3. According to the figure, methanol fed through a feed line 1 is pressurized by a pump 2, pure water fed through a feed water line 3 is pressurized by a pump 4, the methanol and the pure water under pressure are mingled together and supplied to a preheating section 5a. The mixture of methanol and pure water, then, passes through a vaporization section 5b, a superheating section 5c, and becomes a superheated stream. The superheated stream is fed to a reformer section 6 and produces hydrogen gas and carbon dioxide as it passes through reformer tubes 7,7 under catalytic effects of a catalyst retained therein. A mixture of hydrogen and carbon dioxide is fed to the pre-heater 5a for heat-exchange with the mixture of methanol and pure water, and led to a cooling section 8 to be cooled by cooling water supplied through a cooling water line 9 for condensation of the excess water contained therein. The mixture is led to a gas-liquid separator 10 for separating the water and gas containing hydrogen. The gas containing hydrogen is led from the separator 10 to an apparatus for the adsorption separation 12 for separating out the hydrogen and the accompanying products. A high purity hydrogen gas and impurities are fed through lines 13 and 14 respectively. The water extracted at the gas-liquid separator 10 is returned to the feed water line 3 for a re-circulation.

On the other hand, a heat transfer oil for regulating the temperature of each section circulates as follows.

First, the oil is heated by a burner 16 as it passes through a heater device 15. Then, the oil is led through a feed oil line 17. The feed oil line 17 is separated in two lines 18 and 19. The line 18 is connected to the super heating section 5c and the vaporizing section 5b therethrough. The line 19 is connected to the reformer 6. The oil is extracted from the vaporizing section 5b and the reformer 7, mingled together, and returned to the heater means 15 through a pump 21.

The reaction whereby the mixture of methanol and water (aqueous solution of methanol) are reformed to produce hydrogen is described, generally, as follows.

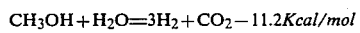

The reaction includes the following two successive reactions, a decomposition process and a conversion process.

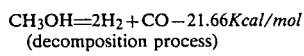

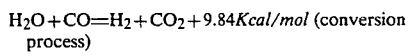

As shown by the above chemical equations, the decomposition process tends to proceed effectively in an elevated temperature because the reaction is endothermic, and the conversion process tends to proceed in a lower temperature because the reaction is exothermic. Catalyst for these processes, mainly oxides of chromium, zinc or copper with additives, are proposed by many patents, for example, Japanese Patent Kokoku (second publication) No. 54-11274, Japanese Patent Kokai (first publication) No. 49-47281, 59-131501, 61-234939, 61-234940 and 61-234941). All these prior publications are intended to decrease the reaction temperature of the decomposition process and to increase the reaction rate. But, as far as the above prior art takes it a premise to proceed the decomposition process and the conversion process at a same temperature, it is difficult to improve this two processes at the same time from the view point of chemical equilibrium. However, for obtaining hydrogen in maximum generation, the decomposition of methanol and conversion of carbonoxide are both needed to increase.

One possible solution for improving both processes is to increase the amount of water contained in the mixture as a material, higher than the amount needed in the stoichiometry. But, as the method inevitably increases the cost because of the energy for evaporating the excess water, the ratio of water and methanol in molecular gram has to be between 1 and 1.5 from an economical point of view, which does not improve the reactivity enough drastically. Another possible solution is to maintain the temperature of the decomposition process higher than that of the conversion process by setting up the different temperature at upper zone and lower zone of the catalyst bed. Though the solution may be derived from the above-mentioned nature of the reactions, there has not been provided a pertinent practical method or system which enables the above temperature control. A system conventionally proposed along the line, in a Japanese Patent application Kokai (first publication) No. 49-47281, is explained as follows.

In the system, the reformer section comprises a high temperature chamber and a low temperature chamber which are connected in series by a piping through which the reactants flow. This construction is based on the fact that the reformer generally comprises a tube bundle composed of a large number of reformer tubes and it is difficult to regularly flow water through the space formed between the tubes for cooling the tube uniformly. In the prior art, the piping has a nozzle for receiving supplementary cooling water. Water is added to the reactant flowing through the piping to lower the temperature before the reactants flow in the low temperature chamber. But it is difficult either to regulate the amount of water fed to each of the reformer tubes by this scheme and the scheme, consequently, makes the composition of the reactant unstable. Therefore, in the tubes to which an excessive amount of the cooling water is supplied, temperature of the reactant becomes lower than a optimum level and the activity of the catalyst is hindered thereby. On the other hand, in the tubes to which only insufficient amount of the cooling water is added, the temperature becomes excessively high and the catalyst becomes inactive either. Thus in total, the scheme does not increase the reactivity of the conversion process as expected.

SUMMARY OF THE INVENTION

The present invention is related to a method and a system for steam reforming methanol in order to produce hydrogen. More specifically, the present invention is intended to improve the reaction efficiency of the steam reforming method of methanol by regulating the temperature of each step to a most desirable temperature for a reaction at each step by virtue of a heat transfer medium circulating through the system.

In a primary aspect of the invention, there is provided, in steam reforming methods of methanol, the methods comprising the steps of heating a methanol-water mixture, the heating step including a preheating process, a vaporizing process and a superheating process, and making the mixture react under effects of a catalyst for producing hydrogen, the reaction step including a decomposition process and a conversion process; a steam reforming method of methanol which is characterized in that a heat transfer medium is used and the method comprises the steps of:

(a) heating the heat transfer medium;

(b) feeding a portion of the heated heat transfer medium and another portion thereof to the decomposition process and the superheating process, respectively, for heat-exchanging with the methanol-steam mixture;

(c) feeding the heat transfer medium from the decomposition process and the superheating process to the vaporizing process for heat-exchanging with the methanol-steam mixture;

(d) leading a portion of the heat transfer medium from the vaporizing process for re-heating thereof, and leading another portion thereof from the vaporizing process to the preheating process, the conversion process and for re-heating thereof, successively.

In a secondary aspect of the invention, there is provided in steam reforming methods of methanol for obtaining hydrogen, the methods comprising the steps of heating a methanol-water mixture, the heating step including a preheating process, a vaporizing process and a superheating process, and making the mixture react under effects of a catalyst for producing hydrogen, the reaction step including a decomposition process and a conversion process; a steam reforming method of methanol which is characterized in that a heat transfer medium is used and the method comprises the steps of:

(a) providing reformer means having a decomposition part and a conversion part containing a catalyst therein, heat exchanger means having a preheating part, a vaporizing part and a superheating part, and heater means;

(b) heating the heat transfer medium by the heater means;

(c) leading a portion of the heat transfer medium and another portion thereof to the decomposition part of the reformer means and the superheating part of the heat exchanger means, respectively, for regulating the temperature thereof;

(d) leading the heat transfer medium from the decomposition part and the superheating part to the vaporizing part of the heat exchanger means to regulate the temperature thereof; and (e) returning a portion of the heat transfer medium directly to the heater means and returning another portion of the heat transfer medium to the heater means after circulating through the preheating part of the heat exchanger and the conversion part of the reformer means.

In a third aspect of the invention, there is provided, in a system for producing hydrogen by a steam reforming method, the system comprising (i) reformer means having a decomposition part and a conversion part for performing decomposition of a methanol-steam mixture to produce intermediate products and for converting the intermediate products to produce hydrogen, respectively; and (ii) heat exchanger means having a preheating part for elevating temperature of liquid mixture of methanol and water, a vaporizing part for vaporizing the mixture, and a superheating part for superheating the vaporized mixture; a system for producing hydrogen comprising:

(a) heater means for heating a heat transfer medium; and (b) feeding means for feeding the heat transfer medium through the system; whereby (c) a portion of the heat transfer medium and another portion thereof are led to the decomposition part of the reformer means and the superheating part of the heat exchanger means, respectively, for regulating the temperature thereof;

(d) the heat transfer medium is led from the decomposition part and the superheating part to the vaporizing part of the heat exchanger means to regulate the temperature thereof; and (e) a portion of the heat transfer medium is led directly to the heater means and another portion of the heat transfer medium is led to the heater means after circulating through the preheating part of the heat exchanger and the conversion part of the reformer means.

BRIEF DESCRIPTION OF THE DRAWINGS

FIG. 3 is a schematic diagram showing a conventional method for reforming methanol.

DETAILED DESCRIPTION OF THE PREFERRED EMBODIMENTS

The present invention will now be described in more detail with reference to the attached drawings wherein like numerals denote identical elements.

Figure 1:
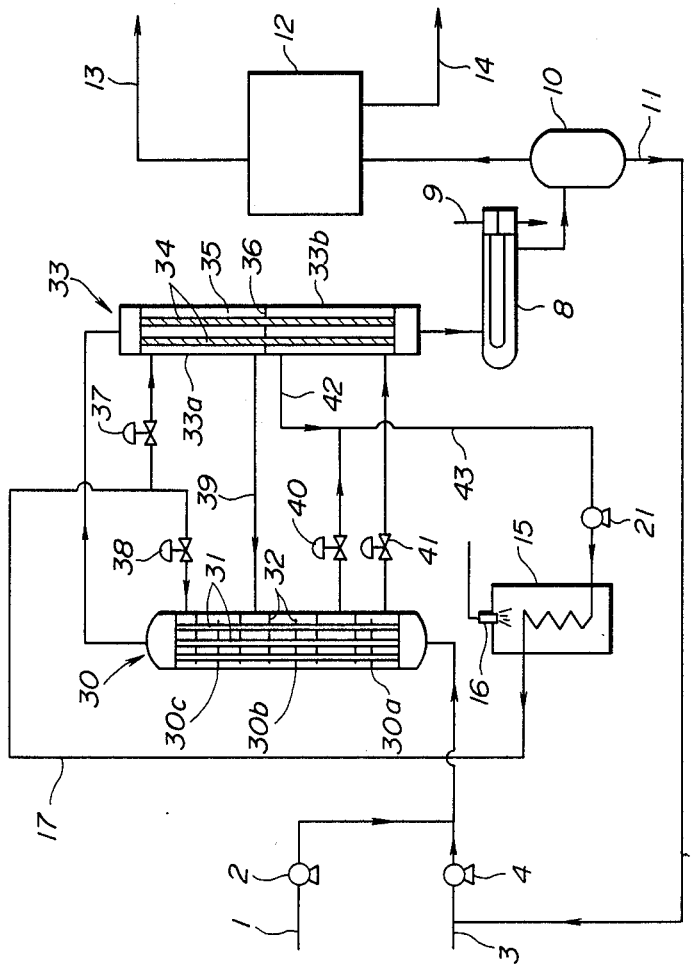
FIG. 1 is a schematic diagram showing a method according to a first embodiment of the present invention.

FIG. 1 shows an embodiment of the present invention. Methanol as raw material is fed by a feed methanol line 1 by means of a pump 2, pure water is fed by a feed water line 3 by means of a pump 4, the methanol and the pure water are mingled together and supplied to a heat exchanger 30. Proportion of water to methanol is between 1 and 1.5 in molecular gram.

The heat exchanger 30, which is a shell-and-tube type, is mainly composed of an outer shell, tubes 31 and partition plates 32, and divided into three parts, a preheating part 30a, a vaporizing part 30b and a superheating part 30c. The mixture of methanol and water is heated to a temperature slightly below the boiling temperature thereof at the preheating part 30a, the mixture is further heated and vaporized at the vaporizing part 30b, and the vapor is further heated at a superheating part 30c to become a superheated vapor having a temperature suitable for a next step in the reformer 33.

A reformer 33 comprises an outer shell defining a first space 35 and reformer tubes 34 disposed in the first space 35 to define a second space therein in which a catalyst is retained. The first space 35 and reformer tubes 34 retained therein are divided into a decomposition part 33a and a conversion part 33b. The mixture of methanol and water, or their intermediate products flow through the second space defined by the reformer tubes 34. The heat transfer medium flows in the first space. The mixture is heated by heat-exchanging with the heat transfer medium and decomposed at the decomposition part 33a while it passes through the reformer tubes 34. The intermediate product produced by the decomposition is cooled by heat exchanging with the heat transfer medium and converted to hydrogen and carbon dioxide at the conversion part.

The heat transfer medium circulates through the system as follows. Temperature of the heat transfer medium is indicated merely to give an approximate temperature thereof and not to indicate that the system works only at that temperature. Further, temperature of the system may vary according to such factors as the pressure of the reformer 33, the activity of the catalyst etc.

The heat transfer medium is heated to 320° C. by a burner 16 in a heater 15, led to pass through a feed line 17, and separated to pass through either of control valves 37 and 38. The heat transfer medium passed through the control valve 37 is lead to the decomposition part 33a of the reformer 33 wherein the heat transfer medium heat-exchanges with the mixture of methanol and water through the reformer tubes 34 whereby the temperature of the heat transfer medium drops to 300° C. After passing through the decomposition part 33a, the heat transfer medium is led to a boundary of the superheating part 30c and the vaporizing part 30b of the heat exchanger 30 through a feed line 39 whereat the heat transfer medium merges with that fed through the control valve 38 and the superheating portion 30c. While passing through the vaporizing part 30b, temperature of the heat transfer medium is decreased to 270° C. by heating the vaporizing part 30b. A portion of the heat transfer medium is led, after passing through the vaporizing part 30b, to a pump 21 through a control valve 40 and a line 43. The rest of the heat transfer medium passes through a preheating part 30a of the heat exchanger 30, being cooled down to 130° C. by heating the preheating part 30a and led to the conversion part 33b of the reformer 33 through the control valve 41. While passing through the conversion part 33b, the heat transfer medium is heated to 200° C. by cooling the conversion part 33b and fed to the pump 21 through lines 42 and 43. The heat transfer medium is pumped out by the pump 21 and passes through the heater 15 in which that is heated again to 320° C. by the burner 16 to recirculate through the above-mentioned circuit.

By virtue of the above-mentioned flow of the heat transfer medium, temperature of the methanol-water mixture in the reformer tube 34 at the decomposition part 33a of reformer 33 is regulated between 250° C. and 300° C. so as to proceed the decomposition of methanol effectively. Also by the heat-exchange with the heat transfer medium, temperature of the reactant in the reformer tube 34 at the conversion part 33b is regulated between 150° C. and 200° C. so as to proceed practicing the maximum conversion of the by-product carbon monoxide to carbon dioxide and increase the production of hydrogen.

One catalytic material packed in the reformer tube 34, such as copper compound and zinc compound which are active for both the decomposition process and the conversion process, may be used as a catalyst for both processes. But, preferably, a catalytic material comprising palladium on silica careed, and a catalytic material comprising copper or copper compounds may be used as catalysts in the decomposition process and the conversion process, respectively, in order to avoid instability at an elevated temperature of catalytic material comprising copper which has a high activity.

Figure 2:
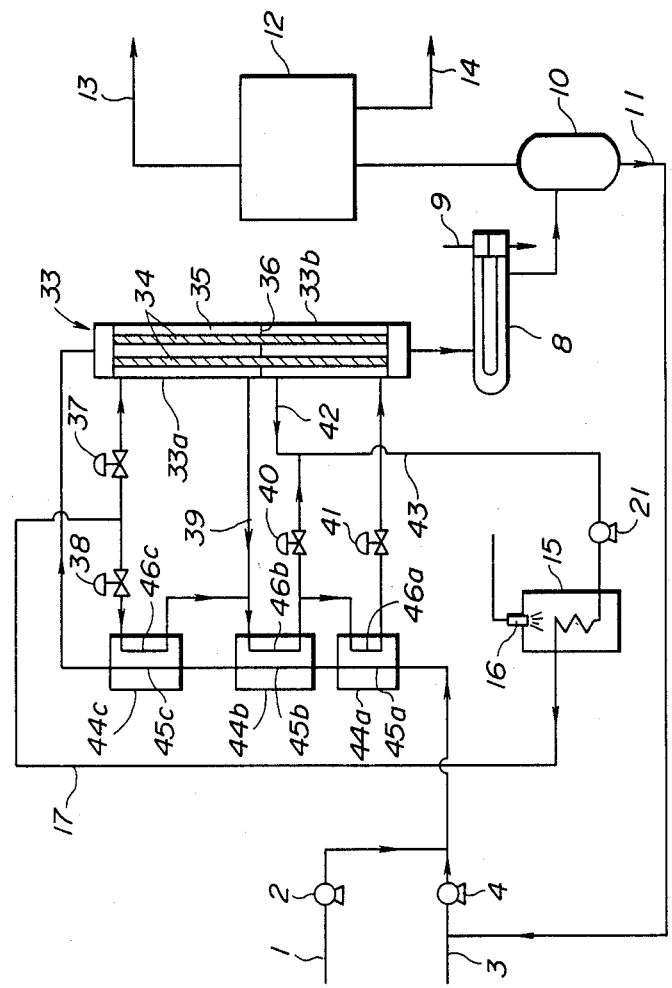
FIG. 2 is a schematic diagram showing a method according to a second embodiment of the present invention.

In the above description, the heat exchanger was so called a shell-and-tube type. But the heat exchanger is not necessarily restricted to this type and any other types, such as plate-and-fin type, may be employed in the present invention. Further, preheating, vaporizing and superheating of the methanol-water mixture is performed in a one piece heat exchanger in the above description. But, the heat exchanger may be composed of three separate units each of which performing each of the processes. FIG. 2 shows an embodiment wherein the heat exchanger 44 which comprises a preheating unit 44a, a vaporizing unit 44b and a superheating unit 44c as separate units. The type of the heat exchanger is a plate-and-fin type wherein the space for raw materials 45a, 45b, 45c are separated from and adjoin with the space for heat transfer medium 46a, 46b, 46c by heat exchanging plates.

As is described above, a reformer is separated to a decomposition part and a conversion part wherein a decomposition of methanol-water mixture and conversion of carbon monoxide are performed, respectively. Temperature of each part is regulated independently to each other with accuracy and uniformity by means of a heat transfer medium by heat exchanging through reformer tubes. Therefore, temperature of the decomposition part and the conversion part is maintained to an ideal temperature for proceeding the reaction to be performed at each part. By virtue of the temperature control, reforming ratio of methanol is increased and the production of carbon monoxide is suppressed.

Low production ratio of carbon monoxide further increases the hydrogen outputted by the system by relieving the adsorptive separator from being stacked by carbon monoxide. Thus, the production yield of high purity hydrogen gas is improved and operation cost is decreased by 10 to 15% compared to conventional methods.

Because the heat transfer medium flows upwards in the conversion part in an opposite direction with respect to the raw materials passing through the reformer tubes, heat of the raw material produced during the exothermic conversion is transferred to the heat transfer medium effectively and used to heat up the raw materials in the preheating part.

As above mentioned, temperature of the system is regulated so that the reactions proceed most effectively at each step and the energy for heating or cooling the heat transfer medium is minimized by optimizing the heat-exchange between the heat transfer medium and the raw materials.

EXAMPLES

An example of steam reforming process of methanol according to the present invention will be described hereinafter.

32Kg/h of methanol is supplied through the feed methanol line 1 and pressurized by the pump 2 to a pressure of 15 ata. At a same time, 18Kg/h of pure water supplied through the feed water line 3 and 5Kg/h of pure water recirculated through the line 11 are pressurized to 15 ata by the pump 4. A mixture of pure water and methanol, 1:1.3 in molecular gram, is supplied to the heat exchanger 30. While passing through the tubes 31 of the heat exchanger 30, through the preheating part 30a, the boiling part 30b and the super heating part 30c, the mixture becomes a super heated stream at a temperature of 300°. After passing through the heat exchanger 30, the mixture is supplied to the reformer 33.

In the reformer 33, the superheated mixture, first, passes through the reformer tubes 34 of the decomposition part 35 whereat the mixture is decomposed under effects of the catalyst and under a temperature between 250° C. and 300° C. to produce hydrogen and carbon dioxide according to the formula (1). Since a portion of methanol is decomposed according to the formula (2), a product gas contain small quantity of carbonoxide. The amount of the carbon monoxide gas is between 2 and 3 volumetric percent. The gas mixture proceeds further to the conversion part 33b of the reformer 33 of which the temperature is regulated between 150° C. and 200° C. By virtue of the temperature regulated by the temperature transfer medium, the conversion reaction (3) proceeds and the amount of the carbon monoxide decreases to between 0.5 and 1.0 volumetric percent to further produce hydrogen and carbon dioxide.

Thus obtained gas mixture containing mainly hydrogen and carbon dioxide at a temperature of 150° C. in reformer 33 is led to the cooler 8 and cooled down to 40° C. by heat-exchanging with the cooling water supplied through the line 9. By virtue of the cooling, surplus water is condensed. Then the gas mixture is led to a gas-liquid separator 10 and the condensed water is separated out of the gas mixture. The water separated by the separator 10, which is 5kg/h, is led through the line 11 to be merged in pure water fed by the feed water line 3 and re-circulates through the circuit. The 89Nm$^3$/h of gas mixture of hydrogen and carbon dioxide as main component separated from liquid at the separator 10 is led to an adsorption separator 12 and high purity hydrogen gas of 50Nm$^3$/h is obtained at 14 ata through the feed line 13 as a product gas. At a same time, gas mixture of remainder of waste containing hydrogen, carbon dioxide and carbon monoxide is led to the heater 15 to be burnt as fuel.

2,200 Kg/h of heat transfer medium to maintain each suitable temperature of decomposition part 33a and conversion part 33b of reformer 33 is heated by the heater 15 to a temperature of 320° C. 2,000 Kg/h of the heat transfer medium is led to the reformer 33 through the line 17 and the control valve 37. The heat transfer medium passes through the decomposition part 33a of the reformer 33 as heat-exchanging with the mixture gas passing through the reformer tube 34 and the temperature thereof is lowered to 300° C. at an outlet of the decomposition part 33a. The heat transfer medium is then led through line 39 to a boundary of the super heating part 30c and the vaporizing part 30b of the heat exchanger. The rest of the heat transfer medium which does not pass through the control valve 37, 200 Kg/h, is led to pass through the control valve 38 and to a superheating part of the heat exchanger 30. Temperature of the heat transfer medium is lowered to 280° C. while it passes through the superheating part 30c and merges into the heat transfer medium led through the decomposition part 33a of the reformer 33.

The heat transfer medium, of which the amount is again 2,200 Kg/h, passes through the vaporization part 30b of the heat exchanger 30 and cooled to 270° C. At a boundary of the vaporization part 30b and the preheating part 30a, the heat transfer medium is separated into two ways. 160 Kg/h of the heat transfer medium is led through the preheating part 30a of the heat exchanger 30, cooled down to 130° C., passes through the control valve 41 and led to the lower end of the conversion part 33b of the reformer 33. The heat transfer medium flow upwards in the reformer 33 as heat-exchanging with the counter current gas mixture passing through the transformer tubes 34. Temperature of the heat transfer medium is heated to 200° C. after the heat exchange and the heat transfer medium is led out of the conversion part 33b at an upper part thereof through the feed line 42. The rest of the heat transfer medium, which is 2,040 Kg/h separated at the boundary of the boiling part 30b and the preheating part 30a, is led to pass through the control valve 40 and merge into the heat transfer medium led out of the conversion part 33b. The heat transfer medium, now again 2,200 Kg/h circulates passing through the pump 21 and heated by the burner 16 in the heater 15 to a temperature of 320° C.

Table 1 shows the results obtained according to the present invention and the results of the conventional methods. The first conventional method was performed according to FIG. 3 as setting the temperature of the reformer to 250° C. The temperature was set to be 300° C. in the second conventional method.

TABLE 1

| | | Conventional Method 1 | Conventional Method 2 | Present Invention |
|---|---|---|---|---|
| Proportion of Raw Materials $H_2O/CH_3OH$ | | 1.3 | 1.3 | 1.3 |
| Space Velocity of Raw Materials to be Supplied ($Nm^3/m^3h$) | | 2,000 | 2,000 | 2,000 |
| Reaction Pressure (ata) | | 14.5 | 14.5 | 14.5 |
| Reaction Temperature | Decomposition part | 250 | 300 | 300 |
| | Conversion part | 250 | 300 | 150 |
| Catalyst | | Compound containing Copper-Zinc | | |
| Transformation Ratio of Methanol (%) | | 95 | 98 | 98 |
| Composition of gas at the Outlet of Reformer (vol %) | $H_2$ | 74.5 | 74.3 | 74.9 |
| | $CO_2$ | 23.5 | 22.7 | 24.6 |
| | $CO$ | 2.0 | 3.0 | 0.5 |

As shown by Table 1, the present invention provides a steam reforming method of methanol by which a high transformation ratio of methanol, a high productivity of hydrogen gas and a low ratio of carbon monoxide are realized. Total hydrogen produced for practical use is largely increased compared to the conventional methods by virtue of the low production of carbon monoxide because the adsorbent in the adsorptive separator is strongly contaminated by the carbon monoxide and the amount of hydrogen gas for regeneration to be abandoned with impurities increases consequently.

After all, the amount of hydrogen gas (the purity of 99.9999 vol.%) in molecular gram obtained from methanol of 1 molecular gram becomes as shown in the following Table 2.

TABLE 2

| First Conventional Method | 2.08 |
|---|---|
| Second Conventional Method | 2.12 |
| Present Invention | 2.39 |

The table shows that the productivity of hydrogen gas is improved by 10 to 15% by virtue of the present invention compared to the conventional methods which is very large in this field of technology.

What is claimed is:

1. A method for steam reforming methanol to produce a product mixture containing hydrogen comprising the step of heating a methanol-water mixture to form a methanol-steam mixture, wherein the heating step includes a preheating process, a vaporizing process, and a superheating process, and a step of reacting the mixture in the presence of a catalyst for producing hydrogen, wherein the reaction step includes a decomposition process and a conversion process, and wherein the method further comprises:

(a) heating the heat transfer medium;
   (b) feeding a portion of the heated heat transfer medium to the decomposition process and feeding another portion of the heated transfer medium to the superheating process, for indirect heat-exchanging with the methanol-steam mixture;
   (c) merging the portion of the heat transfer medium from the superheating process with the portion of the heat transfer medium from the decomposition process;
   (d) feeding the merged portions of the heat transfer medium from the decomposition process and the superheating process to the vaporizing process for indirect heat-exchanging with the methanol-steam mixture;
   (e) leading a portion of the heat transfer medium from the vaporizing process for re-heating thereof, leading another portion of the heat transfer medium from the vaporizing process to the preheating process and then to the conversion process, and combining the two portions for re-heating.

2. A method of steam reforming methanol according to claim 1 which further comprises the steps of mixing methanol and water, to form the methanol-water mixture, and separating the hydrogen from the product mixture.

3. A method of steam reforming methanol according to claim 2 wherein the step of separating hydrogen includes the steps of:

(a) cooling the product mixture containing hydrogen;
   (b) separating the product mixture into a gas stream containing hydrogen and a liquid stream containing water; and
   (c) adsorptively separating the hydrogen from the gas stream.

4. A method of steam reforming methanol according to claim 3 which further comprises the steps of:

(a) recovering the liquid stream containing water from the separating step; and
   (b) recycling said liquid stream to the mixing step.

5. A method of steam reforming methanol according to claim 1 wherein the proportion of methanol and water in the methanol-water mixture is between 1.0 to 1.5 by gram molecule.

6. A method of steam reforming methanol according to claim 1 wherein a catalytic material having palladium and silica therein, and a catalytic material having copper therein are used as catalysts in the decomposition process and the conversion process, respectively.

7. A method of steam reforming methanol according to claim 1 wherein the amount of heat transfer medium circulated is sufficient to maintain reaction temperatures in the decomposition process and the conversion process.

8. A system for producing hydrogen by a steam reforming method, the system comprising (i) reformer means having a decomposition part and a conversion part for performing decomposition of a methanol-steam mixture to produce intermediate products and for converting the intermediate products to produce hydrogen, respectively; and (ii) heat exchanger means having a preheating part for preheating a liquid mixture of methanol and water, a vaporizing part for vaporizing the preheated mixture, and a superheating part for superheating the vaporized mixture; wherein the system further comprises:

(a) heating means for heating a heat transfer medium; and
   (b) feeding means for feeding the heat transfer medium through the reformer means and the heat exchanger means, and arranged such that a portion of the heat transfer medium is led to the decomposition part of the reformer means and another portion of the heat transfer medium is led to the superheating part of the heat exchanger means for regulating the temperature thereof;

the portions of the heat transfer medium from the decomposition part and the superheating part are led to the vaporizing part of the heat exchanger means to regulate the temperature thereof; and a portion of the heat transfer medium from the vaporizing part is led directly to the heater means and another portion of the heat transfer medium from the vaporizing part is led to the heater means after circulating through the preheating part of the heat exchanger and the conversion part of the reformer means.

* * * * *